(12) United States Patent
Harris et al.

(10) Patent No.: US 8,196,407 B2
(45) Date of Patent: *Jun. 12, 2012

(54) SMALL GAS TURBINE ENGINE WITH MULTIPLE BURN ZONES

(75) Inventors: Mark M. Harris, Jupiter, FL (US); Wesley D. Brown, Jupiter, FL (US); Angel M. Garcie, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 555 days.

This patent is subject to a terminal disclaimer.

(21) Appl. No.: 12/487,882

(22) Filed: Jun. 19, 2009

(65) Prior Publication Data

US 2010/0229560 A1   Sep. 16, 2010

Related U.S. Application Data

(63) Continuation of application No. 11/224,906, filed on Sep. 12, 2005, now Pat. No. 7,568,343.

(51) Int. Cl.
*F02C 3/00*   (2006.01)

(52) U.S. Cl. ............................................. 60/732; 60/740

(58) Field of Classification Search .................... 60/732, 60/734, 739, 740, 742, 746, 747, 776, 806
See application file for complete search history.

(56) References Cited

U.S. PATENT DOCUMENTS

| | | | | |
|---|---|---|---|---|
| 2,617,252 A * | 11/1952 | Klein | ............................... | 60/761 |
| 2,916,878 A * | 12/1959 | Wirt | ................................ | 60/759 |
| 3,381,471 A * | 5/1968 | Szydlowski | .................... | 60/745 |
| 3,430,443 A * | 3/1969 | Parnell et al. | ..................... | 60/738 |
| 4,040,251 A * | 8/1977 | Heitmann et al. | .............. | 60/804 |
| 4,192,139 A * | 3/1980 | Buchheim | ........................ | 60/739 |
| 4,928,481 A * | 5/1990 | Joshi et al. | ...................... | 60/737 |
| 4,993,220 A * | 2/1991 | Shekleton et al. | .............. | 60/804 |
| 4,996,838 A * | 3/1991 | Melconian | ...................... | 60/804 |
| 5,177,955 A * | 1/1993 | Shekleton | ........................ | 60/804 |
| 5,526,640 A * | 6/1996 | Brooks et al. | ................... | 60/804 |
| 5,727,378 A * | 3/1998 | Seymour | .......................... | 60/804 |
| 6,481,209 B1 * | 11/2002 | Johnson et al. | ................... | 60/746 |
| 6,925,812 B2 * | 8/2005 | Condevaux et al. | ............ | 60/776 |
| 7,000,404 B2 * | 2/2006 | Palmisano et al. | .............. | 60/782 |
| 2002/0069648 A1 * | 6/2002 | Levy et al. | ....................... | 60/804 |

* cited by examiner

*Primary Examiner* — Louis Casaregola
*Assistant Examiner* — Phutthiwat Wongwian
(74) *Attorney, Agent, or Firm* — John Ryznic

(57) ABSTRACT

A small gas turbine engine for use in an UAV such as a cruise missile, the gas turbine having a combustor forming a primary burn zone and a secondary burn zone, and in which fuel is injected into both the primary and the secondary burn zones by either a rotary cup injector or a plurality of fuel injector nozzles. The secondary burn zone with separate fuel injection allows for the diameter of the engine to be reduced in size but still allow for adequate power and efficiency to be reached for powering the vehicle. Air flow from the compressor is used to cool the combustor walls before being injected into the combustor, and to pass through and cool the guide nozzles and a main bearing located near the hot section of the combustor prior to being introduced into the combustor.

15 Claims, 4 Drawing Sheets

SMALL GAS TURBINE ENGINE WITH MULTIPLE BURN ZONES

CROSS-REFERENCE TO RELATED APPLICATIONS

This application is a Continuation of a Co-pending U.S. Regular application Ser. No. 11/224,906 filed on Sep. 12, 2005.

GOVERNMENT LICENSE RIGHTS

The U.S. Government has a paid-up license in this invention and the right in limited circumstances to require the patent owner to license others on reasonable terms as provided for by the terms of contract No. W31P4Q-05-C-R003 awarded by the US Air Army.

BACKGROUND OF THE INVENTION

1. Field of the Invention

The present invention relates to small, compact and expendable gas turbine engine having a reduced cost of construction and improved performance and operating life in order to increase the range of operation.

2. Description of the Related Art Including Information Disclosed Under 37 CFR 1.97 and 1.98

Small gas turbine engines of the kind used in Unmanned Air Vehicles (UAV) such as a small cruise missile or a drone are well known in the art. These turbines produce a thrust from less than 300 lbs to several hundred lbs. Because these turbine engines must fit within a small space, they tend to be very compact. Since the engine must be compact in size, the combustor must be as small as possible. However, the combustor must provide a long enough burn path to remain lit, and to burn the fuel to produce power without wasting unburned fuel. In small combustors, the fuel droplets size must be small in order to burn in the smaller combustor sections in which the fuel particle residence time for burning the particles is short. Larger fuel particles will take longer to burn and in a small combustor will not burn completely. Effective us of the available volume must be made so that the combustor is able to provide the required heat output over a range of engine operating speeds and flight conditions.

Small expendable gas turbine engines also suffer from poor specific fuel consumption (SFC), which limits the engine to unnecessarily short range and loiter times. Small engines suffer from restricted flight/starting envelopes and operating speeds due to combustor flame-out limitations.

U.S. Pat. No. 3,381,471 issued to Szydlowski on May 7, 1968 shows a combustion chamber for gas turbine engines in which the combustion chamber includes a combustion chamber space 24 and a dilution space 25, where an injection wheel 27 injects fuel into the combustion space 24 for burning, and additional air is added in the dilution space to complete the burning of the fuel that didn't burn in the combustion space.

Another Prior Art swirl combustor is shown in the U.S. Pat. No. 4,996,838 issued to Melconian on Mar. 5, 1991 entitled annular vortex slinger combustor. Melconian shows a combustor having a primary annular combustion chamber 18 and a secondary annular combustion chamber 20, where fuel is injected into the primary combustion chamber through fuel injectors 24 located in the forward portion of the primary combustion chamber or in a different embodiment by a fuel nozzle 100 rotating about the primary axis to deliver fuel into the primary combustion chamber. Louvers 22 are peripherally disposed circumferentially about the inner and outer walls of the primary and secondary chambers to deliver compressed air in a helical direction into both combustion chambers. The combustion of unburned gaseous products from the primary combustion chamber is completed in the secondary combustion chamber.

U.S. Pat. No. 4,040,251 issued to Heitmann et al. on Aug. 9, 1977 entitled gas turbine combustor chamber arrangement in which a combustor includes a primary zone 60 and a dilution zone 62 located downstream from the primary zone. Fuel is injected into the primary zone by a fuel slinger 34 mounted on a shaft 36 which is coupled to rotate with the compressor impeller.

In the Szydlowski, Melconian, and Heitmann inventions discussed above, all three of these combustors suffer from the same problem: combustion space is large in order to provide the required space to allow for enough fuel to burn to generate the gas stream for the engine. Therefore, the combustor would not be practical in a small, compact gas turbine engine used in a UAV. The addition of the secondary combustor section downstream of the primary combustor section does not reduce the overall size of the combustor to a size that would be practical in today's UAV which is smaller than a cruise missile.

U.S. Pat. No. 5,526,640 issued to Brooks et al on Jun. 18, 1996 shows a gas turbine engine with a primary combustion zone 40*a* and a secondary combustion zone 40*b*, a forward main bearing 46 and a rear main bearing 48, a fuel slinger 38 to inject fuel into the primary combustion zone. Air flows from a compressor into an outer air annulus 60, through air tubes 64, into an inner air annulus 62, through an opening 36*d* and into an air/fuel annulus 96, into a slinger 38, and then into the primary combustion zone 40*a*. The air/fuel mixture passing through the annulus flow path 96 is used to lubricate both main bearings 46 and 48 and to cool the turbine hub portion 30*a*. The second embodiment of FIG. 9 shows similar structure. However, Brooks does not show a fuel injector for the secondary combustion zone. Also, the flow rate of air through the rear main bearing is in the range of 2% or less of the total air flow rate into the combustor. This very low flow rate would not provide enough cooling for the bearing.

U.S. Pat. No. 5,727,378 issued to Seymour on Mar. 17, 1998 entitled Gas Turbine Engine with a main bearing located near a turbine section, where a portion of the compressor air is diverted into a cooling cavity 49 that cools the bearing near the turbine wheel, and then into the turbine section without passing through the combustor. Both main bearings are located upstream of the combustor and the turbine sections of the engine. In the Seymour invention, the combustor is not positioned between the two main bearings, and the cooling air for the one main bearing is not used in the combustor.

It is an object of the present invention to provide for a gas turbine engine small enough to fit within a small UAV such as a small cruise missile or drone.

It is another object of the present invention to provide for a small gas turbine engine that has improved operating times and low weight in order to increase the range and loiter time of the UAV.

An additional object of the present invention is to make a low cost and easier to manufacture gas turbine engine having a low parts counts with a minimal number of fuel injection points.

It is another object of the present invention to provide a small gas turbine engine with a rotary cup combustor to deliver fuel and air to a primary burn zone and a secondary burn zone in the combustor in order to maximize combustor operating range and efficiency as well as to provide for a low pressure source to draw the cooling air across the bearing for cooling purposes. The rotary cup combustor will allow for heavy fuels to be burned in that the rotary cup combustor provides excellent fuel break-up and large fuel passage sizes.

Another object of the present invention is to use the rotary cup as a fuel pump by passing the fuel through the rotary shaft and into the rotary cup, where the fuel is pumped to high pressure due to rotation of the shaft, allowing for the fuel pump to be significantly smaller, lower cost and more precise with respect to fuel metering.

Another object of the present invention is to provide for a single igniter at the outer combustor wall, the igniter being located in a stagnation point between the primary burn zone and the secondary burn zone, in which the fuel is sprayed directly toward the igniter where the flow stagnation point is located, providing for the widest possible engine relight envelope.

These objects and others will be described below in the detailed description of the invention and the accompanying drawings.

BRIEF SUMMARY OF THE INVENTION

The present invention is a small, compact gas turbine engine in which a combustor includes two burn zones separated by a rotary cup fuel injector in which fuel and air are injected into both combustor zones to produce a swirl effect in the two zones. Compressed air leaving the compressor passes over both the front and rear portions of the combustor for cooling purposes, through guide nozzles located upstream of the turbine blades to cool the guide nozzles, and through a main bearing located in a hot zone near the combustor to cool the bearing, before being passed into the combustor for burning. Combustor wall cooling is provided by the compressor discharge air before entering the combustor. The rotary cup fuel injector includes parabolic shaped surface to force the fuel into a film that produces very small size droplets when discharged into the combustor. The rotary cup shape and surface finish are selected so that fuel is spread thinly and uniformly around the outer diameter of the injector.

The combustor includes two burn zones, a primary burn zone located in an aft portion of the combustor and a secondary burn zone located in a rearward portion of the combustor, the two burn zones providing for maximum combustor output in a given small volume. The primary zone is designed for maximum residence time and recirculation, and is responsible for engine ignition and lean stability. The secondary zone is designed for maximum efficiency of the combustor at full power operation and during starting. The secondary zone can be designed to aid in ignition if desired, but its main function is to complete combustion of fuel that does not burn in the primary zone. The secondary zone allows for the primary zone to operate at fuel-rich conditions since it provides air and re-circulation for complete burning. This arrangement is critical for small engines used in missiles or UAVs in order to minimize installation volume requirements while providing adequate engine throttle ability without flame-out. Also, a larger combustor can have enhanced stability and/or lower emissions using the two burn zones.

The combustor can be configured without wall cooling skirts or holes by using backside cooling and/or thermal barrier coating (or, TBC) which maximizes the volume for burning. Wall cooling is achieved via external convection. The combustor may have wall cooling where required. The preferred wall cooling method is "effusion" (closely spaced, angled, small holes through the liner walls).

The rotary cup fuel injection provides for fine fuel atomization for easy ignition as well as efficient and clean burning. The rotary cup lip diameter and rotational speed provide for droplet sizes well below those required for ignition, even at low speed (<7% of full speed) and with cold or viscous fuels. The rotary cup also allows for fuel injection to occur through a single, relatively large passage or tube, making it resistant to coking, plugging, or fouling. The rotary cup allows for fuel injection into both the primary and secondary burn regions and zones, either simultaneously or in stages in order to maximize combustor operating range and efficiency. Fuel atomization for unassisted cold ignition is one of the key benefits of the rotary cup atomization system. Reliable ignition and rapid acceleration without the need for expensive and heavy start assist systems and ignition systems is possible because of the rotary cup injector. Improved low speed efficiency for faster, more reliable, starting, and lower cruise-speed fuel burn is another advantage.

Fuel may be injected into the engine via a variety of different feed lines. Fuel can be injected into the primary zone from a tube in the forward end of the engine or form the aft end of the engine. Fuel can be injected into the secondary zone from a tube in the aft end of the engine. The fuel injected into the secondary zone can also be used to pass through a bearing located near the combustor to cool the bearing before being discharged into the combustor for burning.

The rotary cup may have vanes or radial grooves to aid in swirling combustor internal flow. Since the rotary cup surface speeds are high, a great deal of swirl can be imparted to the flow entering the combustor without losing pressure in a way that reduces overall engine efficiency.

The rotary cup accommodates incorporation of a shaft fuel pump. In this case, fuel would enter the engine through a hole down the center of the shaft, pass to the rotary cup, and get pumped to high pressure via shaft rotation as it passes into the combustor through a set of small radial holes. This allows the engine fuel pump to be significantly smaller, lower cost and to be more precise with respect to fuel metering.

Ignition is achieved via a single igniter at the outer combustor wall. The rotary cup sprays fuel directly toward the igniter where there is an air flow stagnation point, ideal for ignition. By properly locating the igniter, ignition may be achieved in the primary, secondary, or both burn zones. This provides a wider range of fuel and air ratios at which ignition can occur, resulting in the widest possible engine relight envelope. The combustor also has few parts, requiring only one igniter, one to four fuel injection tubes, simple and plain holes, and a small number of sheet metal components. This provides for a reliable, producible, and low cost system.

DETAILED DESCRIPTION OF THE INVENTION

Figure 5:
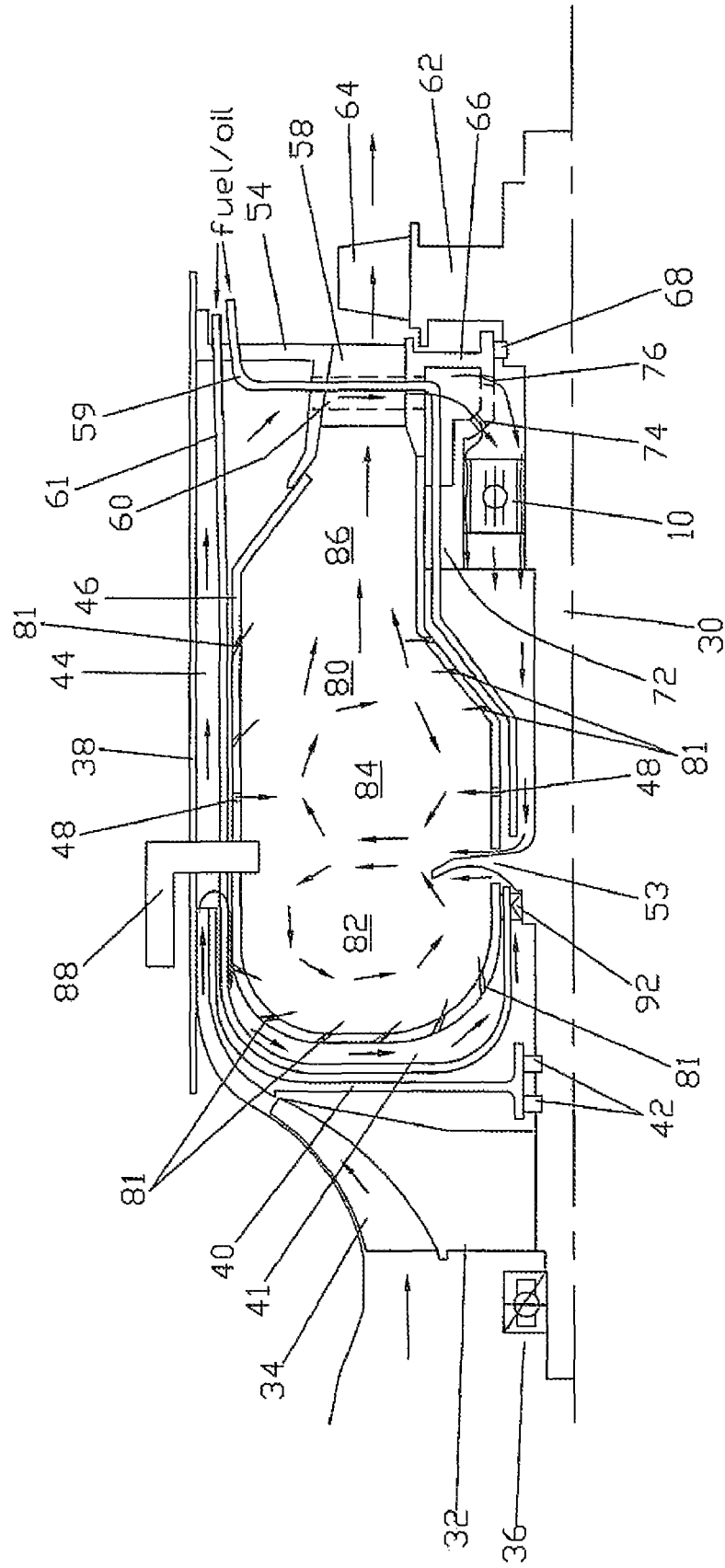
FIG. 5 shows a cross section view of a gas turbine engine of a first embodiment of the present invention with a rotary cup fuel injector delivering fuel into the primary and the secondary burn zones.
Figure 6:
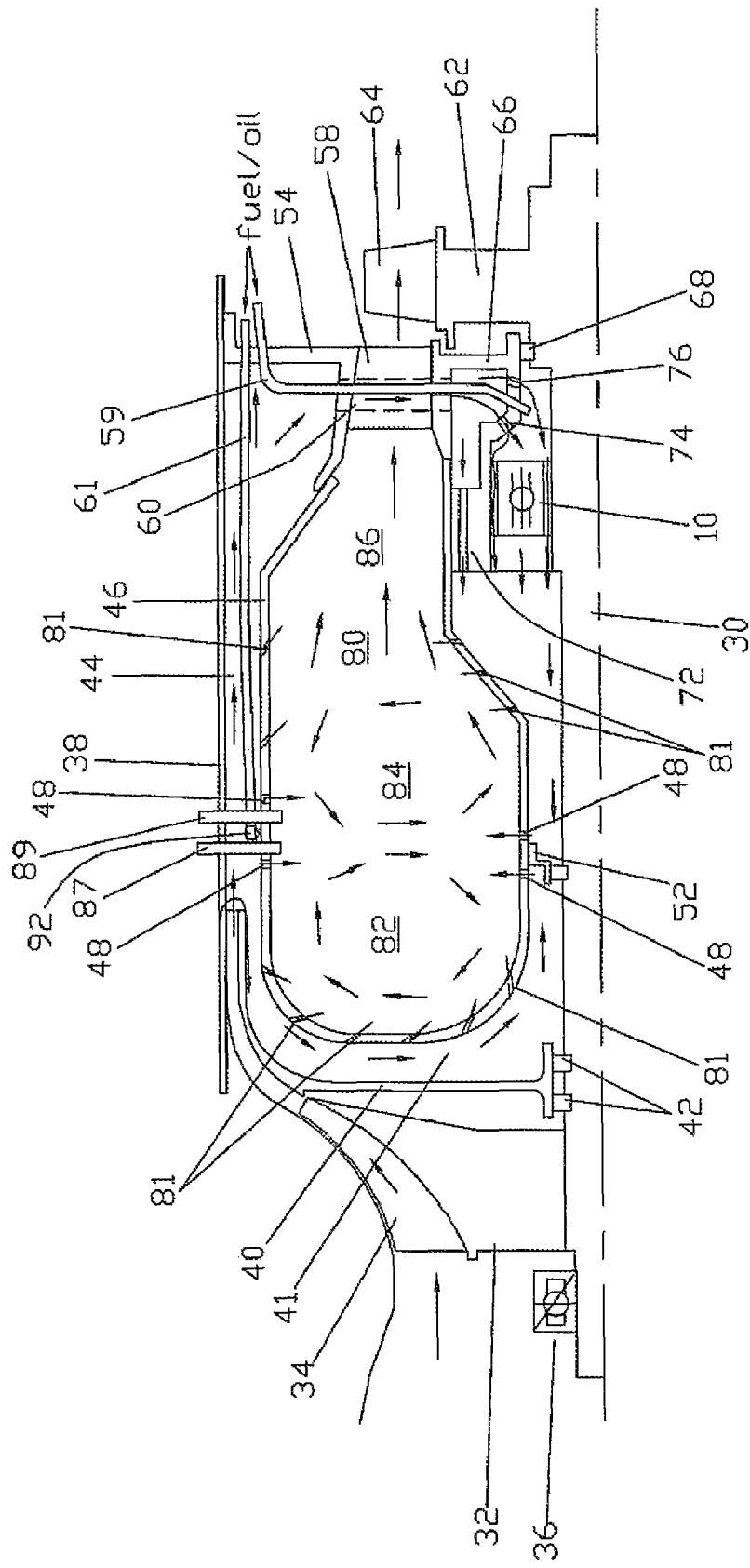
FIG. 6 shows a cross section view of a gas turbine engine of a second embodiment of the present invention with a seal member along an inner wall of the combustor to separate the aft air flow around the combustor from the front air flow around the combustor prior to being injected into the combustor, and where fuel injectors supply fuel into both combustor zones.

The present invention is a small gas turbine engine primarily used in Unmanned Arial Vehicles (UAV) such as a small cruise missile in which a rear bearing used to support the rotor shaft and located in the hot section of the turbine is cooled with cooling air diverted from the compressor, the cooling air passing through the bearing inner and outer races to maintain the races at similar temperatures to prevent radial clearance from developing in the bearing, the cooling air then being discharged into the combustor to be burned with fuel. A rotary cup fuel injector is used to inject fuel into the combustor, the combustor being separated into a primary burn zone located aft in the combustor and a secondary burn zone located downstream from the primary burn zone. The rotary cup fuel injector injects fuel into both burn zones to promote a swirl flow within the respective burn zones in order to promote full burning of the fuel. Compressed air supplied from the compressor passes over all outer surfaces of the combustor and enters the combustor through air cooling holes and air supply holes strategically located around the combustor. FIGS. 1-4 show the preferred embodiment of the air cooled bearing used in the present invention. FIG. 5 shows a rotary cup fuel injector having the two burn zones, while FIG. 6 shows the seal member separating the air flows outside of the combustor.

Figure 1:
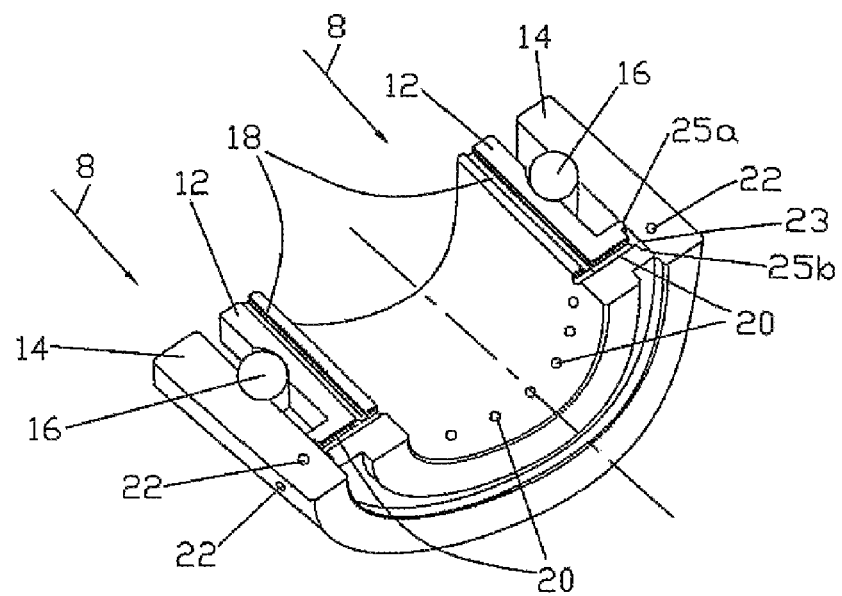
FIG. 1 shows a three dimensional view of a cross section through halve of the bearing in a plane parallel to a rotational axis of the bearing.

FIG. 1 shows the bearing in a three dimension view of a cross sectional of the bearing with an inner race 12, an outer race 14, a roller ball 16, an inner race longitudinal cooling passage 18, an inner race radial cooling passage 20, and an outer race swirl passage 22. An annular entrance chamber 23 is formed on the radial outer end of the inner race radial cooling passages 20, the annular chamber 23 forming an annular passage around the perimeter of the inner race. On the sides of the annular chamber 23 are projections that form a seal 25a and 25b between the inner race 12 and the outer race 14. The annular chamber 23 receives the air flow from the outer race swirl passages 22. The present invention shows the annular chamber as part of an extension on the inner race 12. However, the annular chamber could be on a projection extending from an inside surface of the outer race 14 and forming two sealing surfaces against a surface of the inner race.

Figure 2:
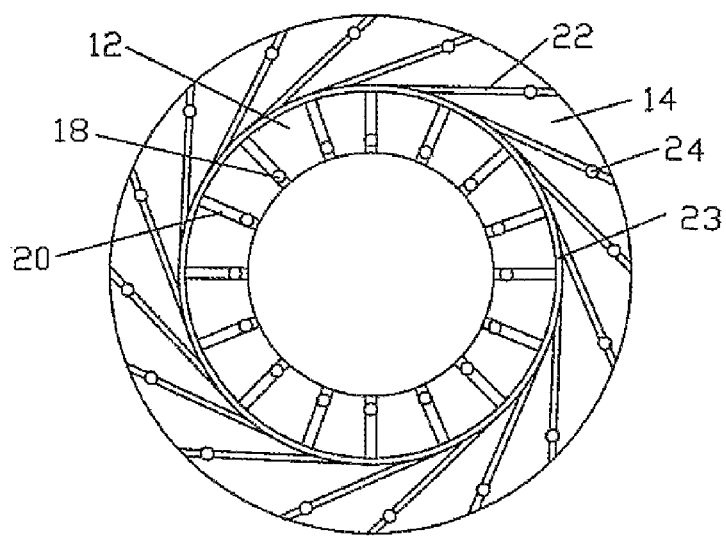
FIG. 2 shows a sectional view of the bearing along the axis of rotation and parallel to a plane passing through the cooling passages in the radial directions.

FIG. 2 shows cross sectional views of the bearing with the inner race 12 and the outer race 14, the inner race longitudinal cooling passages 18 and the inner race radial cooling passages 20, outer race longitudinal cooling passages 24, and the outer race swirl cooling passages 22. The annular chamber 23 is located on the outer side of the inner race 12, and the inner race radial passages 20 lead into the annular chamber 23.

Figure 3:
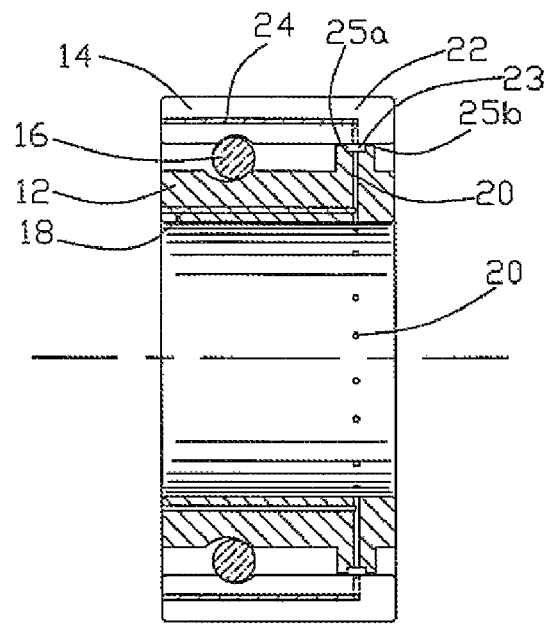
FIG. 3 shows a sectional view of the bearing half in a plane parallel to the axis of rotation of the bearing.

FIG. 3 shows the bearing with the inner race 12 and the outer race 14, and the cooling fluid passages therein. Cooling air enters the outer race longitudinal passages 24, flows into the outer race radial passages 22 toward the annular chamber 23, into the inner race radial passages 20, and then into the inner race longitudinal passages 18, providing a cooling fluid to both races.

The bearings 16 are made of ceramic silicon nitride to reduce the centrifugal loads due to their lower density compared to steel. Balls of this material have a high hardness which results in excellent wear resistance and longer life for the bearing. The outer race 14 and inner race 12 are made of materials, such as 440C or Cronidur® 30, which are tempered at 600 degrees F. and above, or Stellite 6B and MP159 which allows for a long shelf life after storage in a humid environment without rusting.

The bearing of the present invention uses no cage to retain the bearings balls. Eliminating the cages reduces possible failure modes due to cage-ball and cage-race friction, and well as reduces the friction, reduces heat generation, and increases bearing life. The bearing internal clearance is in the range of 0.0005 inches to 0.0012 inches. The cooling passages in the races are arranged to cool both races to about the same temperature in order to maintain the internal clearance between the inner and the outer races. If the inner race reaches a temperature much higher than the temperature of the outer race, the distance between contact points for the roller balls on the races will decrease, and the stress will increase, leading to faster wear. The pre-swirl cooling passages 22 in the outer race are angled with respect to the rotational axis of the bearing from zero degrees to about 30 degrees, and preferably in the range from 10-20 degrees.

The concept here is to pre-swirl the cooling air to a tangential velocity approximately equal to the tangential velocity of the bearing's inner race. This ensures that the inner race receives a lower relative temperature for cooling than the outer ring, providing effective clearance control. Additional cooling can be achieved by vortexing to the inner ring passages 18 through the radial passages 20. An entrance chamber 23 is formed at the beginning of the inner race radial passages 20. Leakage of cooling air can be reduced by controlling the gap clearances (25a, 25b) to within a range of 0.001 inches to 0.0002 inches. By providing cooling air to both the inner and outer race of the bearing, the temperature difference of the races remains within an acceptable limit to prevent radial clearance from changing between the two races due to temperature differences. A radial clearance beyond a certain limit (either too large, or too small) will cause the bearing assembly to quickly destroy itself.

In operation, the bearing is mounted in an engine in which airflow 8 flows toward the bearing 10 as seen in FIG. 1. Portions of this airflow 8 will enter the outer race longitudinal passages 24 and flow toward the outer race swirl passages 22. The outer race 14 is non-rotating since it is secured to the engine casing. The airflow in the outer race swirl passages 22 as seen in FIG. 2 flows toward the inner race in a direction tangential to the inner race. The airflow from the outer race swirl passage 22 then flows into annular chamber 23, and then into the inner race radial passages 20, and from the inner race radial passages 20 into the inner race longitudinal passages 18 and out from the bearing 10 in an opposite direction to the original airflow 8. The outer race swirl passages 22 are set at such an angle that the airflow through these passages increases in tangential velocity to more closely match rotational speed of the outer surface of the inner race. This increased tangential velocity of the air flow will produce a drop in the temperature of the cooling air (due to a conservation of energy), and therefore provide a higher thermal gradient between the inner race of the bearing and the cooling air. Thus, a more effective cooling takes place. When the bearing is mounted in the casing and on the rotating shaft, radial passages 20 and swirl passages 22 are blocked by the shaft and the casing to prevent air flow from passing out these openings. The openings of longitudinal passages 24 and 18 are left open to allow airflow into and out of these passages.

The number of passageways and size of the passageways can vary depending on the cooling requirements of the bearing. Larger passageways will allow for greater volume of cooling fluid. So would an increase the number of passageways. However, using larger size or greater number of passageways could decrease the rigidity of the races.

The bearing life is increased by providing for a special coating on the races. A coating of Tungsten Disulfide or Titanium Nitride is applied which reduces the coefficient of friction compared with oil, and also reduces heat generation in the bearing. This coating also acts as a self-lubricant for the bearing rolling contact surface. Grease with a grease retainer can also be applied to the bearing to add additional lubrication. Suitable commercially available grease is DSF-5000 available from Schaefer Mfg. Co., of St. Louis, Mo. 63104. Also, an oil and/or fuel mist or VPL can also be used for lubricating the bearing.

Figure 4:
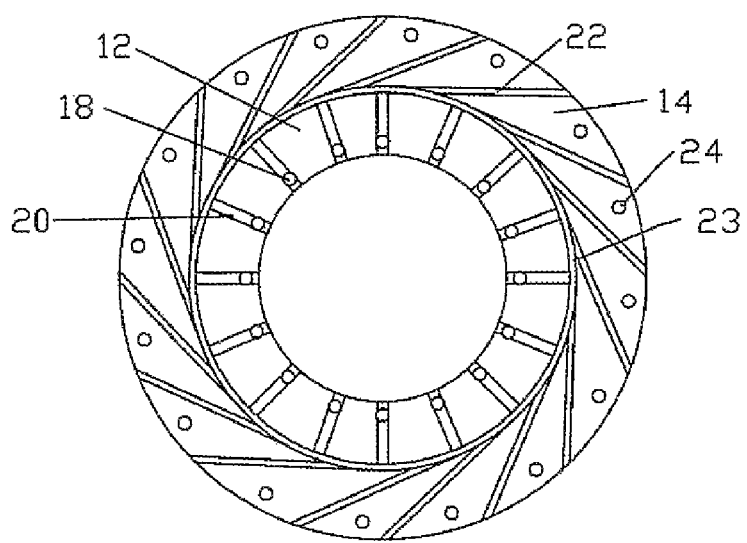
FIG. 4 shows a second embodiment of the present invention in which the cooling holes 24 do not intersect with the cooling holes 22 as in the first embodiment.

A second embodiment of the bearing of the present invention is shown in FIG. 4 in which the longitudinal cooling passages 24 in the outer race 14 does not intersect or make a fluid connection to the radial and tangential cooling holes 22 as is shown in the first embodiment and in FIG. 2. In the second embodiment, the outer race would be mounted such that the openings of the cooling holes 22 are not blocked in order to allow for cooling fluid to enter the cooling passages 22. The second embodiment of FIG. 4 operates in the same way as described with respect to the first embodiment.

FIG. 5 shows the gas turbine engine with the bearing of FIGS. 1-4 used therein. The gas turbine engine includes a rotor shaft 30, a compressor disc 32, a compressor blade 34, a front bearing 36 to rotatably support the rotor shaft 30, a front side wall 40 to separate the compressor section from the combustor section, a forward air flow passage 41, a front side wall shaft piston ring seals 42 to seal the rotor shaft 30 from the front side wall 40, a turbine engine casing 38, a bypass flow passage 44, a combustor wall 46, combustor air supply passages 48, a turbine guide nozzle outer shroud and support 54, a turbine guide nozzle 58, a turbine nozzle inner shroud 66, a turbine rotor disc 62, a turbine blade 64, a turbine inner shroud piston ring seal 68 to seal the inner shroud 66 and the rotor shaft 30, cooling air supply holes 74 and 76, a rear combustor support member 72, a combustor 80, a primary burn zone 82, a secondary burn zone 84, a dilution zone 86, a single igniter 88 to light the fuel in a stagnation zone (the location where the primary zone 82 flow and the secondary zone 84 flow diverge from each other), combustor cooling air supply holes 81, a rotary cup fuel injector 53, a swirl vane 92 to induce a pre-swirl to the compressed air delivered to the combustor, and a rear support bearing 10 located in the hot zone of the engine near the combustor exit and the turbine section. For the purpose of this disclosure, the meaning of the terms hot zone with respect to the bearing 10 and the turbine or combustor is defined to include any area near the combustor and turbine that is hot enough to effect the operation of the bearing due to the extreme heat. Fuel is delivered to the rotary cup injector through fuel lines 59 and 61. Fuel line 59 delivers fuel from a location rearward of the engine through the guide nozzles 58, through the combustor and bearing support 72, and into a rear surface of the rotary cup injector 53, which then injects the fuel into the secondary zone 84 of the combustor 80. Fuel line 61 delivers fuel from a rearward location of the engine, through the bypass channel 44, through the air flow passage 41, and onto a front surface of the rotary cup injector 53, which then injects the fuel into the primary burn zone 82. In an alternate embodiment, fuel line 61 can originate from a front end of the engine, entering the engine shown in FIG. 5 from just above the impeller 34 and into the passage 41 toward the rotary cup injector 53.

Piston ring seals 42 and 68 are used instead of labyrinth seals because the ring seals are lower in cost, are smaller, and produce a better seal than labyrinth seals. Since the engine of the present invention has a short life time, the longer lasting yet lower sealing labyrinth seals are not needed.

The rotary cup injector 53 includes a parabolic shaped front side facing the primary burn zone 82 and a substantially flat and slanting back side facing the secondary burn zone 84. The rotary cup injector surfaces can be smooth or have vanes or radial grooves therein to aid in swirling the combustion internal flow. Both surfaces sling the fuel outward along the surfaces to produce a thin film flow of the fuel on the injector surfaces that promotes droplets of fuel for ease in burning. Since the rotary cup surface speeds are high, a great deal of swirl can be imparted to the flow entering the combustor 80 without losing pressure in a way that reduces overall engine efficiency.

The airflow through the engine and bearing 10 is shown by the arrows in FIG. 5. Air supplied by the compressor is delivered to the bypass channel 44 and the forward inlet of the combustor 80 located between the front side wall 40 and a forward portion of the combustor 80, through the swirl guide members 92, and into the rotary cup fuel injector 53. Some of this air is supplied to the various cooling holes 81 located in the combustor 80 at an angle as shown in FIG. 5. Some of the bypass air is supplied to the combustor air supply passages 48 for delivery to the combustor for burning with the fuel. The combustor air supply holes 48 are located at a certain positions in the combustor at an angle to deliver the compressed air toward a point in the combustor where the primary burn zone and the secondary burn zone meet. The combustor cooling air supply holes 81 are positioned about the combustor and at such an angle to inject the cooling air along the inner wall of the combustor and at such an angle to promote the swirl direction of the burn zones as shown in FIG. 5 with respect to the arrows representing the air flow paths. The compressed air delivered from the compressor flows around the outer walls of the combustor to provide cooling, and eventually enters the combustor through the air supply holes 48 spaced about the combustor.

A portion of the bypass air flow is diverted through the hollow section 60 of the guide nozzles 58 located downstream from the combustor exit and upstream of the turbine blades 64. The guide nozzles 58 perform the well known function of guiding the combustor exhaust gas stream onto the turbine blades 64. The air flow acts to cool the guide nozzles. The air flow through the guide nozzles 58 then passes through cooling holes 74 and 76 in the inner shroud 66 and into the rear bearing 10.

The rear bearing 10 includes a plurality of cooling air passages in the inner race and the outer race as described in FIGS. 1-4 above. The cooling air passes through the bearing, and then into the combustor through the rotary cup injector to be burned with the fuel in the combustor. Some of this air flow from the bearing is used to pass through combustor cooling holes 81 to cool the inside surface of the combustor, and some of the air flow is supplied through the combustor air supply passage 48 located just upstream of the rotary cup injector 53. The location and direction of airflow through the combustor air supply holes 48 in this section of the combustor 80 is such to promote the swirl directions of the secondary burn zone 84 shown in FIG. 5.

Rotation of the rotary cup injector 53 of the present invention provides a low pressure gradient (compared to the higher pressure supplied by the compressor) to promote air flow from the compressor outlet and through the two air supply paths leading into the combustor 80 from the points upstream of the rotary cup injector and from the point downstream of the rotary cup injector (which passes through the guide nozzles 58 and the bearing 10) as well as injecting the fuel into the two burn zones of the combustor 80.

Passing a portion of the air flow from the compressor into the bearing as described above acts to cool the bearing races such that no significant thermal temperature difference between the inner race and outer race of the bearing develops (which can cause radial spacing between the two race surfaces to increase), and therefore prevents the bearing from breaking apart. Passing the cooling air from the bearing back into the combustor improved the performance by not ejecting the heated cooling air out of the engine or at any point downstream of the turbine nozzle 58. Thus, the engine efficiency is kept high. In the preferred embodiment, fuel is directed to the primary/forward side of the rotary cup through a fuel line 59. this method of fuel injection may accommodate part, or all, of the fuel required by the engine. Fuel may also be directed to the secondary/aft side of the rotary cup through another fuel line 61. Modulation of the fuel injected in each line 59 and 61 may be performed in order to maximize combustor efficiency and stability. Modulation of fuel flow between primary and secondary zones may also be performed as a means of controlling gaseous emissions from the combustor.

in one embodiment, the fuel is delivered to the rotary cup injector 53 through the engine shaft by a low pressure feed pump (not shown). Because of the high rotation rate of the rotary cup injector, the fuel is pressurized without the need of the prior art high pressure pumps.

A single igniter 88 is used in the preferred embodiment to deliver fuel while starting the engine. The rotary cup injector 53 sprays fuel directly toward the igniter where there is an air flow stagnation point formed by the separation of the air flows from the primary and secondary burn zones, ideal for ignition. By properly locating the igniter 88, ignition may be achieved in the primary, secondary, or both burn zones. This provides a wider range of fuel and air ratios at which ignition can occur, resulting in the widest possible engine relight envelope. Multiple igniters may be used.

FIG. 6 shows a second embodiment of the air cooled bearing arrangement for the small gas turbine engine. The same reference numerals that appear in the FIG. 5 embodiment are for the same members in the FIG. 6 embodiment. In the FIG. 6 embodiment, the rotary cup injector 53 of the first embodiment is not used. In place of the rotary cup injector is 3 to 8 fuel injectors 87 spaced evenly around the circumference of the combustor. The fuel injectors 87 inject fuel into the combustor primary zone 82 for burning with the air as did the rotary cup injector of the previous embodiment. Fuel may be injected directly into the secondary zone 84, as well, through injectors 89. The seal member 52 prevents mixing of these two air flows and forces these two airflows into the two burn zones 82 and 84 of the combustor 80, and then the dilution zone 86, as does the rotary cup injector 53 of the first embodiment. In the second embodiment of FIG. 6, because no rotary cup injector is used to deliver the fuel into the combustor 80, the fuel is delivered through the fuel line 59 into the air flow passage upstream of the bearing 10. Injecting the fuel at this location also acts to cool the bearing 10. The fuel is mixed with the air flow and then directed into the secondary burn zone 84 of the combustor 80 through air supply passages 48 in the combustor wall. A primary zone fuel supply tube 61 delivers fuel to the primary burn zone 82 at a point upstream of the seal member 52 to be mixed with the air flow passing between the front plate 40 and the front portion of the combustor 80.

The present invention therefore discloses two embodiments for a small gas turbine engine that uses a bearing located in the rear portion of the engine near the combustor exit and the turbine portion of the engine that represents the highest temperature region of the turbine engine. Locating one of the two main rotor shaft bearings in this location—as opposed to locating both main bearings forward of the compressor as disclosed in the Patent Application Publication US 2004/0216445 A1—allows for a better rotary support structure for the rotary shaft while providing necessary cooling for the bearing to allow for the bearing to be located in this region of the engine. An improved small gas turbine engine is therefore possible using the air cooled bearing of the disclosed present invention.

Instead of using the fuel delivery lines 59 and 61 as shown in the FIGS. 5 and 6 embodiments, the shaft 30 can include a fluid supply passage (not shown) to deliver fuel to the rotary cup injector. A low pressure feed pump would be used to deliver the fuel into this fuel supply passage in the shaft 30. Rotation of the rotary cup injector 53 would provide the pressure boost as discussed in the above embodiment that makes use of the fuel lines 59 and 61.

We claim the following:

1. A gas turbine engine comprising:
  a compressor connected to a rotor shaft;
  a turbine connected to the rotor shaft;
  an annular combustor positioned between the compressor and the turbine and encircling the rotor shaft;
  the annular combustor being defined by an outer wall and an inner wall;
  the annular combustor having an axial length greater than a distance between the outer wall and the inner wall;
  the annular combustor forming a primary combustion zone in a forward end of the combustor and a secondary combustion zone immediately downstream from the primary combustion zone;
  a first fuel injection means to inject a fuel into the primary combustion zone to produce a primary combustion swirl;
  a second fuel injection means to inject a fuel into the secondary combustion zone to produce a secondary combustion swirl in an opposite direction than the primary combustion swirl direction;
  the first and second fuel injection means injects both fuels from one of the outer or inner walls of the combustor, and the distance between the inner wall and the outer wall of the combustor is short enough so that the first and second fuels and air are impinged against the opposite wall to produce the swirl in the combustion chamber; and,
  the first and second fuel injection means includes a rotary cup injector rotatably fixed to the rotor shaft, the rotary cup injector includes a front face and a rear face in which the fuel is supplied onto and then discharged as a thin film into the two combustion zones.

2. The gas turbine engine of claim 1, and further comprising:
  the front face of the rotary cup injector is parabolic in shape and the rear face is substantially flat and slightly inclined toward the front face.

3. The gas turbine engine of claim 1, and further comprising:
  the combustor includes the primary combustion zone and the secondary combustion zone and then a dilution zone located downstream from the two combustion zones and immediately upstream of a guide nozzle of the turbine, the dilution zone being thinner than the two combustion zones.

4. The gas turbine engine of claim 1, and further comprising:
the forward end of the combustor is positioned underneath a diffuser of the compressor;
the combustor is positioned within an enclosure that defines a cooling air passage between the outer wall of the annular combustor and the enclosure wall;
the combustor outer wall at the primary and secondary combustion zones includes air supply holes to discharge air from the diffuser into the two combustion zones; and,
The cooling air passage between the enclosure and the outer wall is narrow such that a high velocity is developed to produce a high convection cooling of the outer wall.

5. The gas turbine engine of claim 3, and further comprising:
the guide nozzle includes a cooling air channel extending through the nozzle; and,
means to divert cooling air from the diffuser through the cooling air channel in the guide nozzle and then into the secondary combustion zone.

6. The gas turbine engine of claim 5, and further comprising:
a bearing to support the aft end of the rotor shaft positioned in the cooling air passage so that the diverted cooling air passing through the guide nozzle channel and into the secondary combustion zone also passes through the bearing to provide cooling for the bearing.

7. The gas turbine engine of claim 1, and further comprising:
the first and second fuel injection means includes a first fuel injector positioned on an outer wall of the combustor to inject fuel into the primary combustion zone and a second fuel injector positioned on an outer wall of the combustor and downstream from the first fuel injector to inject fuel into the secondary combustion zone.

8. The gas turbine engine of claim 4, and further comprising:
the annular combustor is enclosed within the enclosure such that all of the cooling air from the diffuser flowing over the outer wall to provide cooling for the combustor eventually flows into the combustor.

9. The gas turbine engine of claim 1, and further comprising:
the rotary cup injector extends into the combustor through an opening in an inner wall of the combustor.

10. The gas turbine engine of claim 1, and further comprising:
the first and second fuel injection means injects the fuel into a location where the two combustion zones meet.

11. The gas turbine engine of claim 1, and further comprising:
the primary combustion zone and the secondary combustion zone having about the same height when measured from the outer wall and the inner wall.

12. A gas turbine engine comprising:
a compressor connected to a rotor shaft;
a turbine connected to the rotor shaft;
an annular combustor positioned between the compressor and the turbine and encircling the rotor shaft;
the annular combustor being defined by an outer wall and an inner wall;
the annular combustor being enclosed by an enclosure forming a cooling air passage around the combustor forward end and inner and outer walls, the cooling air passage being thin enough to produce a high rate of cooling air flow around the combustor;
a plurality of cooling air supply holes spaced around the combustor to discharge the cooling air into the combustor;
a first fuel injection means to inject a fuel into the primary combustion zone to produce a primary combustion swirl;
a second fuel injection means to inject a fuel into the secondary combustion zone to produce a secondary combustion swirl in an opposite direction than the primary combustion swirl direction;
the combustor is formed with a primary burn zone in the forward end and a secondary burn zone downstream from the primary burn zone; and,
the forward end of the combustor is positioned underneath a diffuser outlet.

13. The gas turbine engine of claim 12, and further comprising:
the combustor includes a dilution zone located downstream from the secondary burn zone; and,
a guide nozzle downstream from the dilution zone, the guide nozzle including a cooling air passage to allow for cooling air to flow around the dilution zone and then into the combustor.

14. The gas turbine engine of claim 12, and further comprising:
the enclosure provides for all of the air discharged from the diffuser and used to cool the combustor to be discharged into the combustor and burned with the fuel.

15. The gas turbine engine of claim 12, and further comprising:
the first and second fuel injection means both inject fuel from the inner wall or the outer wall and at an axial location between the primary combustion and the secondary combustion zone.

* * * * *